Dec. 22, 1931.  J. H. DALE  1,837,762

BELT LOOP CUTTING AND SORTING MACHINE

Filed March 20, 1930  7 Sheets-Sheet 1

Inventor
J. H. Dale
By Watson E. Coleman
Attorney

Inventor
J.H.Dale

By Watson E. Coleman
Attorney

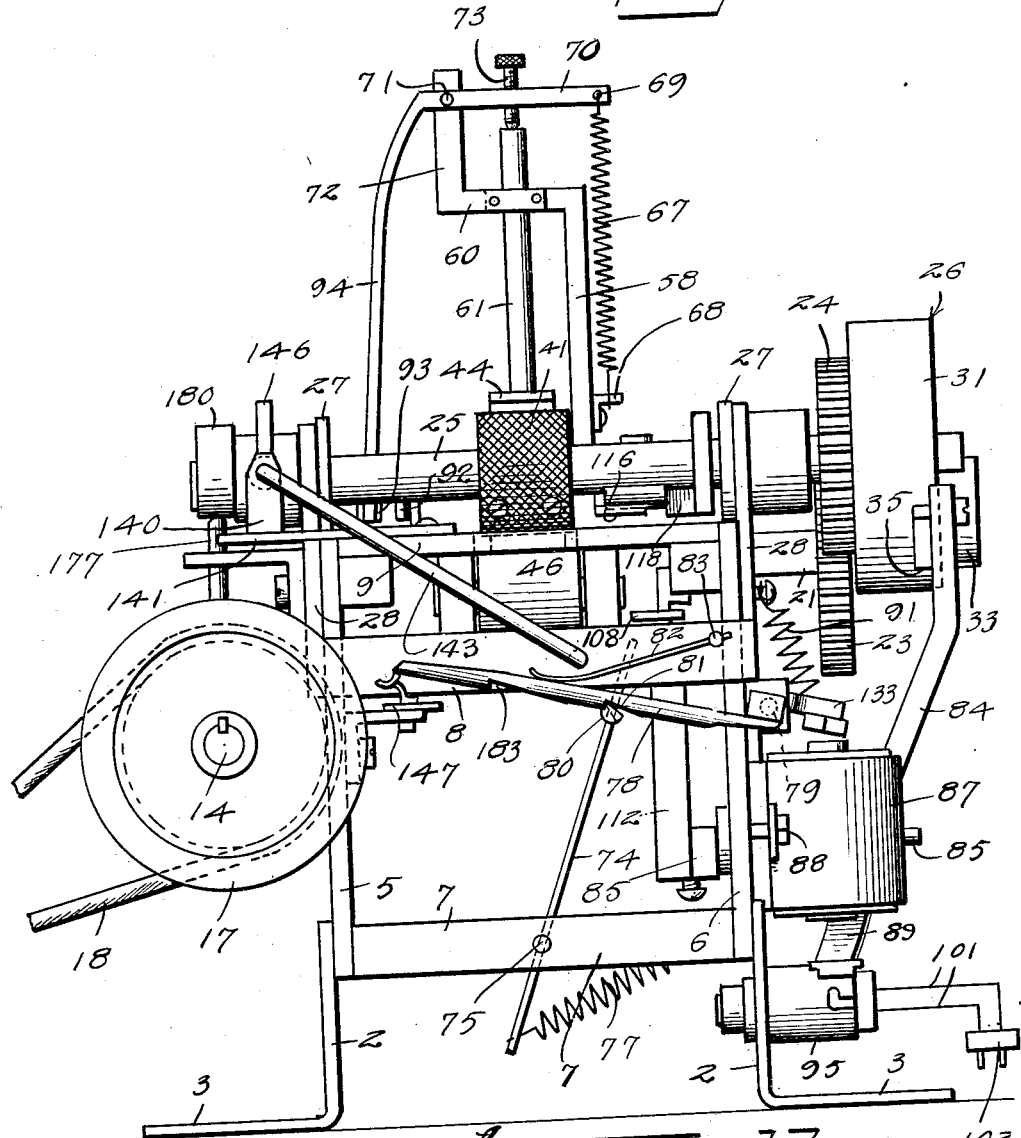

Dec. 22, 1931.　　　　J. H. DALE　　　　1,837,762
BELT LOOP CUTTING AND SORTING MACHINE
Filed March 20, 1930　　　7 Sheets-Sheet 4
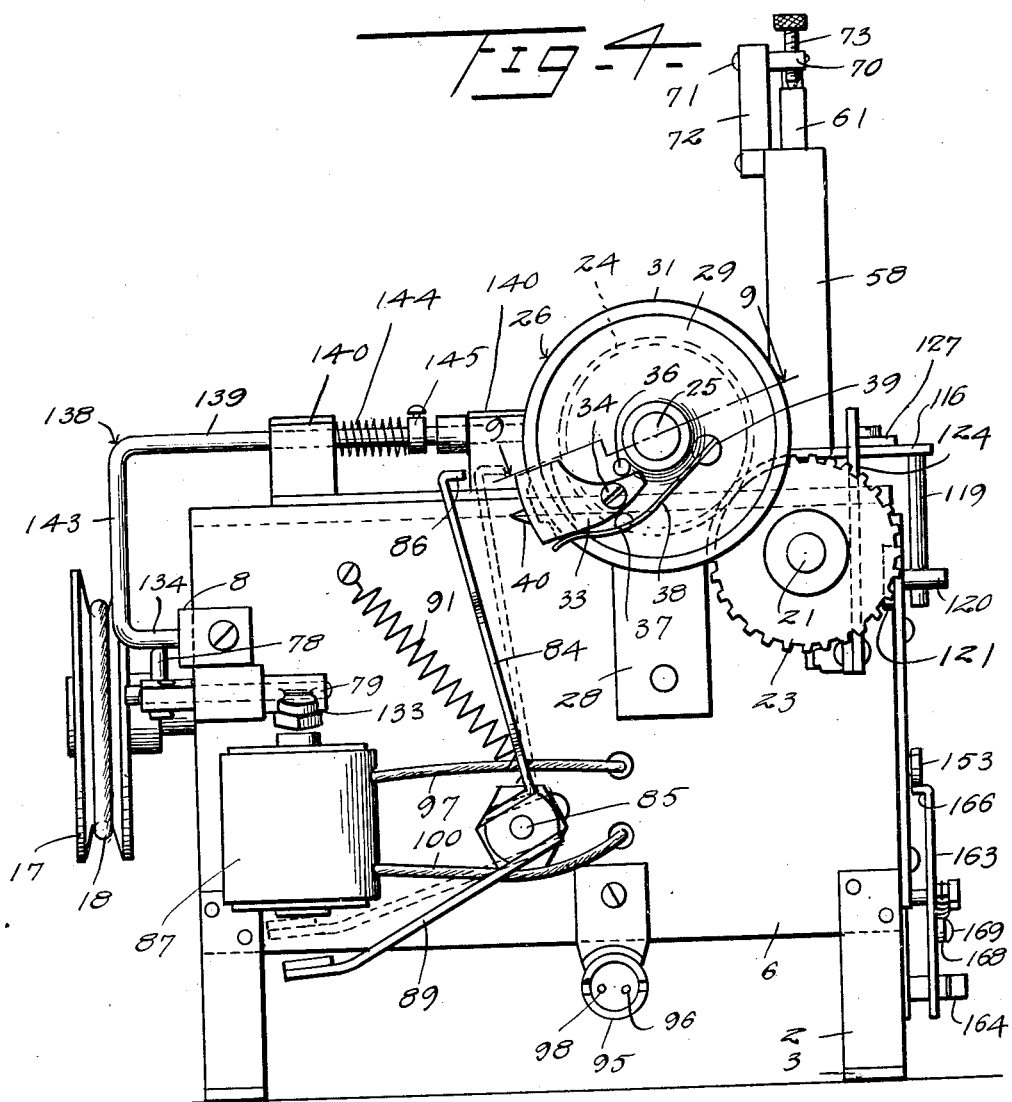
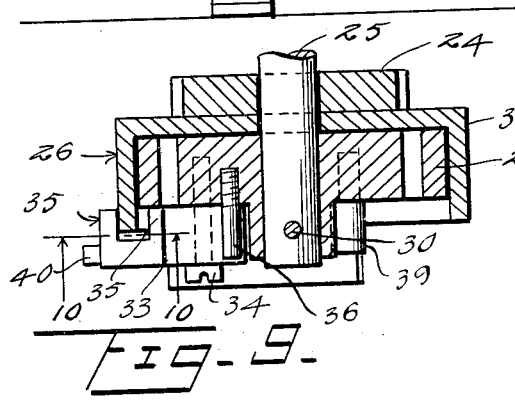
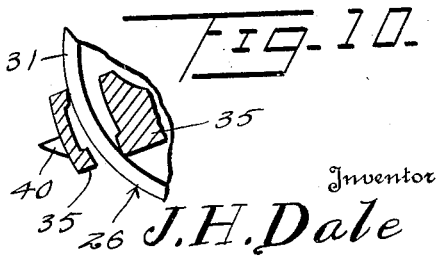
Inventor
J. H. Dale
By Watson E. Coleman
Attorney Dec. 22, 1931.  J. H. DALE  1,837,762
BELT LOOP CUTTING AND SORTING MACHINE
Filed March 20, 1930   7 Sheets-Sheet 5

Inventor
J. H. Dale
By Watson E. Coleman
Attorney

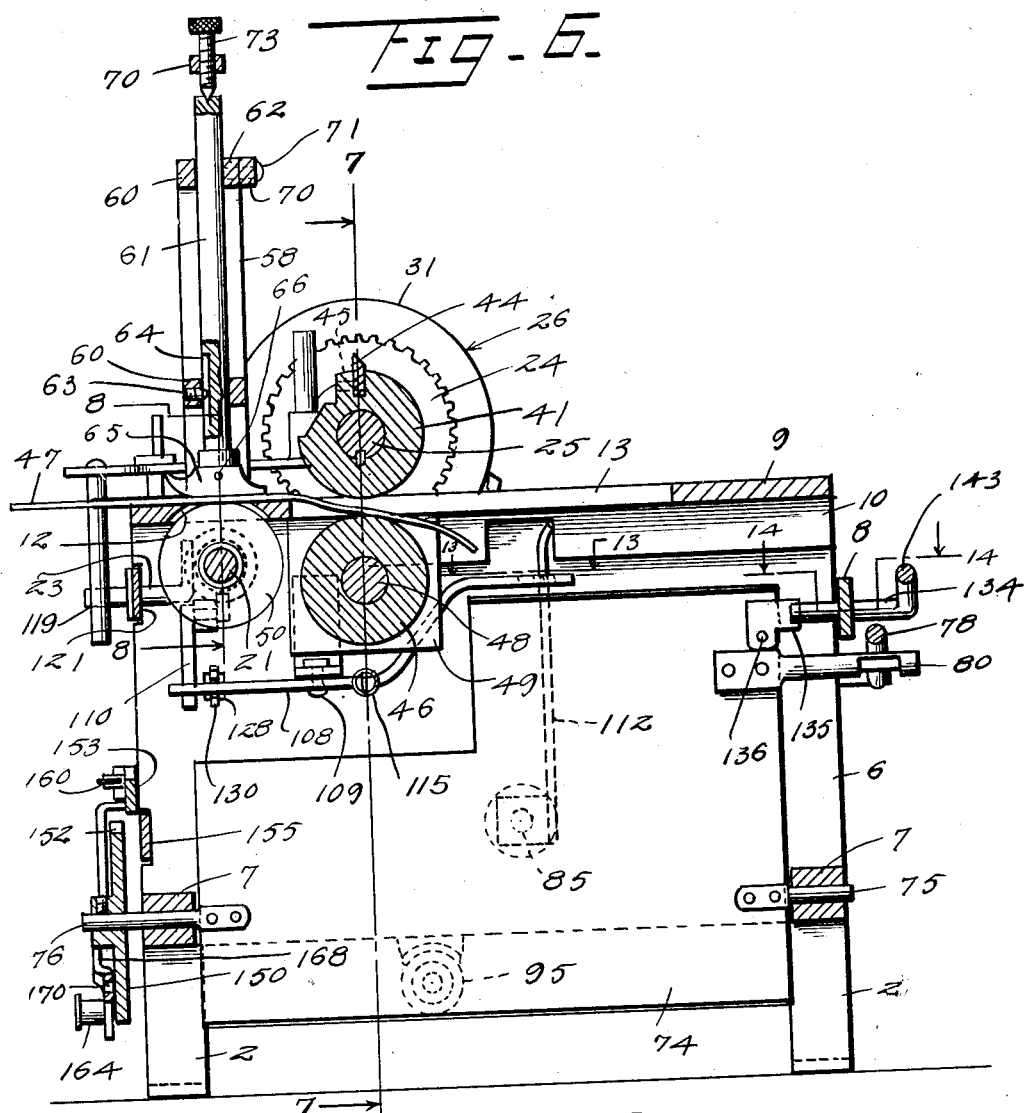
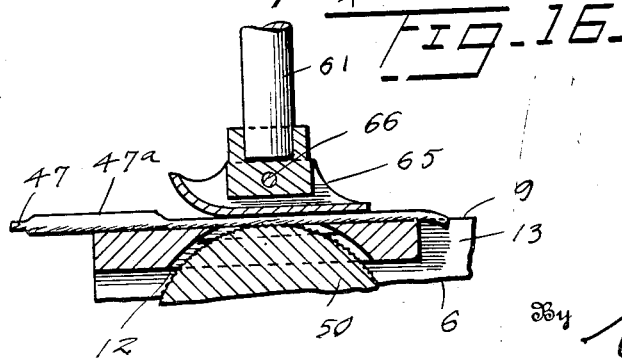

Dec. 22, 1931.   J. H. DALE   1,837,762
BELT LOOP CUTTING AND SORTING MACHINE
Filed March 20, 1930   7 Sheets-Sheet 7
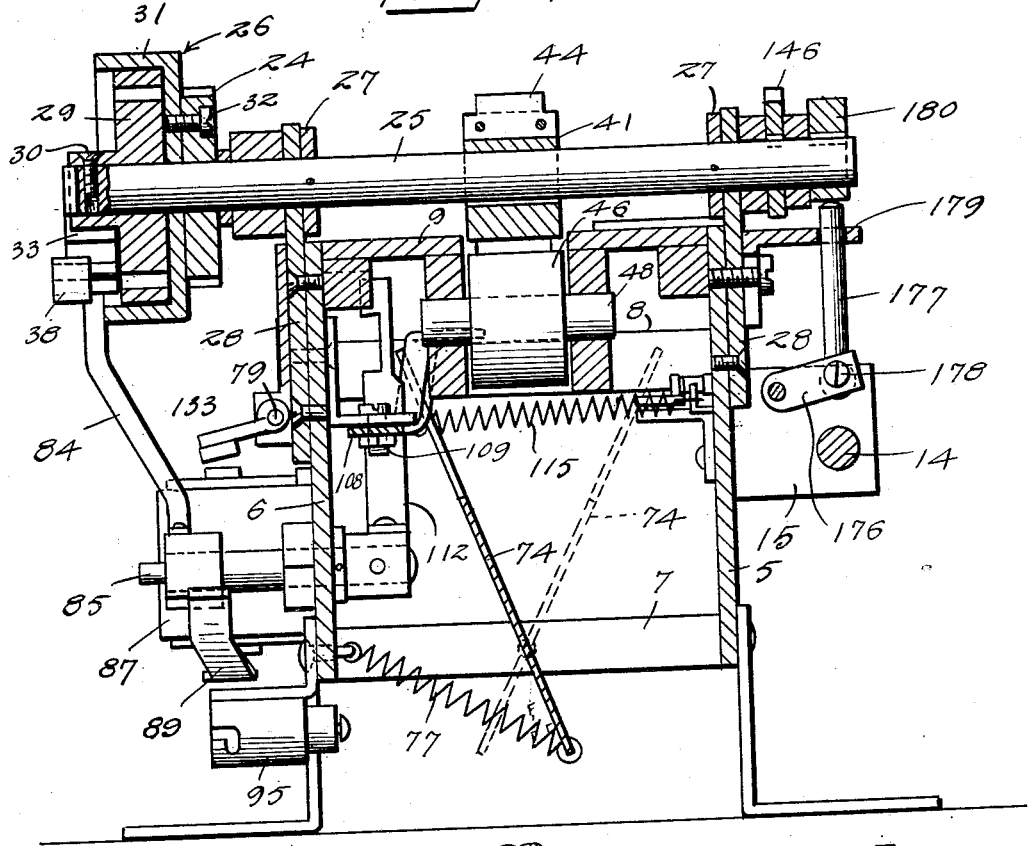
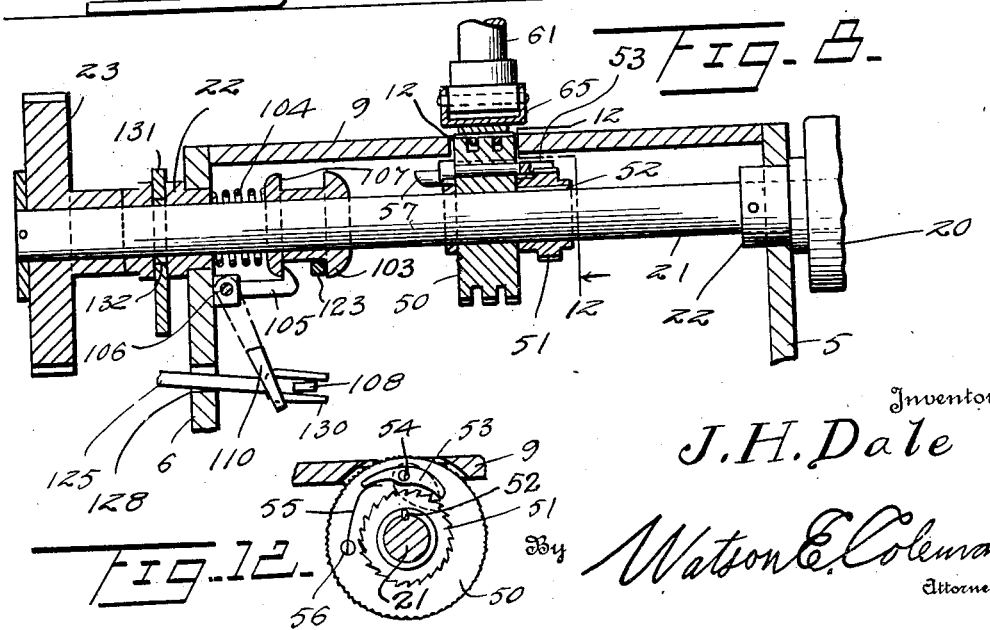
Inventor
J. H. Dale
By Watson E. Coleman
Attorney Patented Dec. 22, 1931

1,837,762

UNITED STATES PATENT OFFICE

JAMES H. DALE, OF CAIRO, ILLINOIS, ASSIGNOR TO D. L. MARX CO. INC., OF CAIRO, ILLINOIS, A CORPORATION OF ILLINOIS

BELT LOOP CUTTING AND SORTING MACHINE

Application filed March 20, 1930. Serial No. 437,424.

This invention relates to a machine for cutting belt loop blanks or straps. Blanks of this kind are cut from a narrow strip of fabric, and are terminally sewed to the waist bands of trousers and cooperate therewith to provide belt receiving loops. The strip is made up of sections stitched together with their end portions in over-lapped relation. The thickened parts of the strip, which result from the over-lapping of the end portions of the strip sections, are unsuitable for use as belt loop blanks or parts thereof.

The invention has for one of its objects to provide a machine of the character stated which shall be adapted to cut the blanks from the other parts of the strip which are solely capable of being used to provide the blanks.

The invention has for a further object to provide a machine of the character stated which shall be adapted to provide blanks at a rate heretofore found impossible and with comparatively little or no waste in the usable parts of the strip.

The invention has for a further object to provide a machine of the character stated which shall be adapted to cut the usable parts of the strip into blanks of any desired or required length.

The invention has for a further object to provide a machine of the character stated which shall be adapted to sort the blanks and the thickened portions of the strip, the blanks being deposited in one receptacle and the thickened portions in another.

The invention has for a further object to provide a machine of the character stated which shall be adapted to cease operation immediately after the entire strip has been operated upon.

The invention has for a still further object to provide a machine of the character stated which shall be simple, durable and be capable of being operated and maintained in a high state of efficiency at a comparatively low cost, and which shall be entirely automatic in its operation.

With the foregoing and other objects in view, the nature of which will appear as the description proceeds, the invention consists in the construction, combination and arrangement of parts hereinafter fully described and claimed, and illustrated in the accompanying drawings, wherein:—

Figure 3 is a view in front elevation of the machine;

Figure 4 is a view similar to Figure 2 looking at the opposite side of the machine;

Figure 5 is a top plan view of the machine;

Figure 6 is a longitudinal sectional view taken on the vertical plane indicated by the line 6—6 of Figure 5;

Figure 7 is a transverse sectional view taken on the vertical plane indicated by the line 7—7 of Figure 6;

Figure 8 is a transverse sectional view taken on the vertical plane indicated by the line 8—8 of Figure 6;

Figure 9 is a detail sectional view taken on the planes indicated by the line 9—9 of Figure 4;

Figure 10 is a detailed sectional view taken on the plane indicated by the line 10—10 of Figure 9;

Figure 11 is a diagrammatic view of the means for controlling the machine when a thickened portion of the strip passes beneath the presser foot and for stopping the operation of the machine after the entire strip shall have passed beneath the presser foot;

Figure 12 is a detailed sectional view taken on the vertical planes indicated by the line 12—12 of Figure 8;

Figure 14 is a detailed sectional view taken on the horizontal planes indicated by the line 14—14 of Figure 6;

Figure 15 is a detailed sectional view illustrating the sorting plate in position to separate the thickened portion of the strip from the belt loop blanks;

Figure 16 is a detail sectional view taken on the vertical plane indicated by the line 16—16 of Figure 1, and Figure 17 is a diagrammatic view of the feeding and cutting means.

Figure 1:
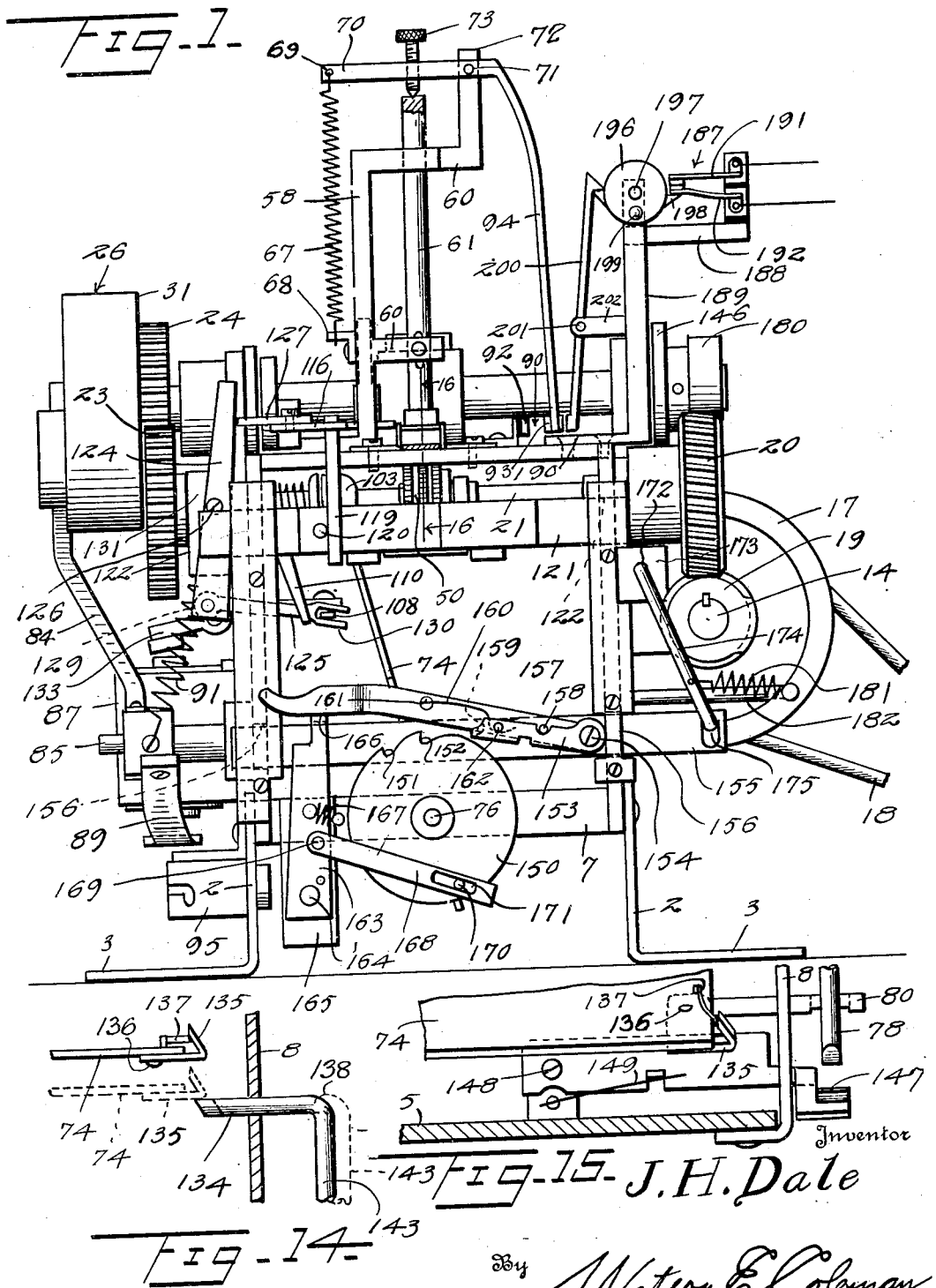
Figure 1 is a view in rear elevation of the machine.
Figure 2:
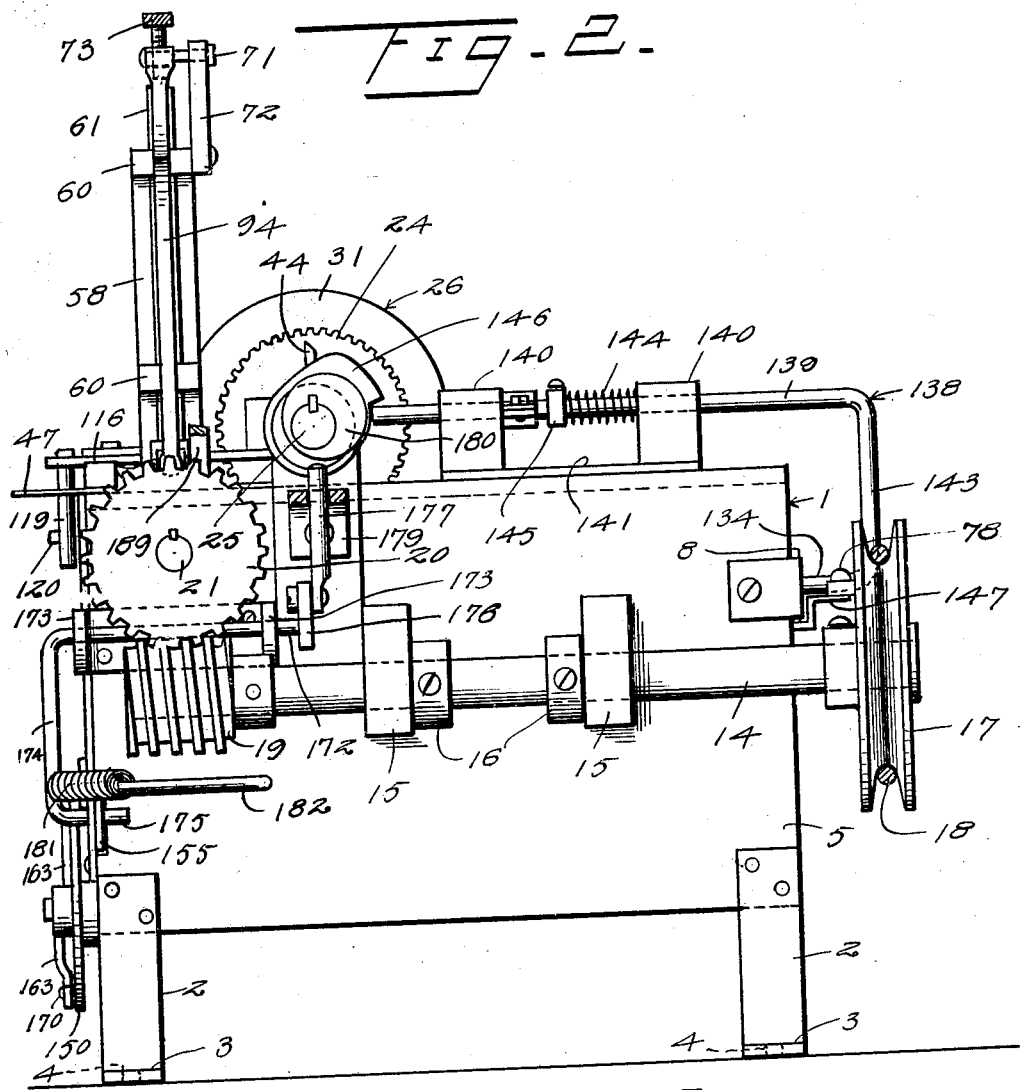
Figure 2 is a view in side elevation of the machine.

The machine comprises a frame 1 supported by legs 2. The legs 2 are provided at their lower ends with outwardly extending horizontal portions 3 which are adapted to rest upon a bench or other suitable support and which are provided with openings 4 to permit the machine to be screwed or bolted to the support. The frame 1 comprises side plates 5 and 6 which are secured together by lower front and rear transverse bars 7 and an upper front transverse bar 8. The frame 1 also comprises a top plate 9 which rests upon longitudinal bars 10 secured to the inner surfaces of the side plates 5 and 6 near the upper ends of the latter, and the top plate is secured to said bars by elements 11. The top plate 9 is provided in its longitudinal center near its rear end with an opening 12, and it is also provided at said center thereof and forwardly beyond said opening with an elongated slot 13.

A main shaft 14, which is located at the right hand side and extends longitudinally of the frame 1, is journaled in bearings 15 which are secured to the outer surface of the side plate 5, and it is held against endwise displacement by collars 16 which are secured thereto and contact with the opposing sides of the bearings. The shaft 14 has fixed to its front end a pulley 17 which is adapted to be connected by a belt 18 to an electric or other suitable motor, not shown. The shaft 14 has fixed to its rear end a worm 19 which meshes with a worm gear 20 fixed to the right hand end of a counter-shaft 21. The shaft 21 is located at the rear end and extends transversely of the frame 1 and it is journaled in bearings 22 carried by the side plates 5 and 6. The shaft 21 is located below and close to the top plate 9.

The shaft 21 has fixed to its left hand end a spur gear 23 which meshes with a similar gear 24 which is fixed to the knife shaft 25 through the medium of a clutch 26. The knife shaft 25 extends transversely of the frame 1, is located above and close to the top plate 9, and is located forwardly beyond the shaft 21. The shaft 25 is journaled in bearings 27 which are carried by brackets 28 secured to the side plates 5 and 6. The clutch 26 is mounted on the left hand end of the shaft 25, and comprises a disc 29 fixed, as at 30, to the shaft and a drum 31 loose on the shaft. The gear 24 is fixed, as at 32, to the circular wall of the drum 31, and the annular wall of the drum surrounds the disc 29. A detent 33 is pivoted near its inner end, as at 34, to the outer face of the disc 29, and is provided at its outer free end with rigid jaws 35 which are arranged inwardly and outwardly of the annular wall of the drum 31. The detent 33 is movable into an active or inactive position. When it is in active position, the detent 33 establishes a driving connection between the gear 24 and the shaft 25, and when it is in inactive position, it frees the shaft from the gear. The detent 33 is limited in its movements by stops 36 and 37 which are carried by the disc 29 and are arranged at opposite sides of the detent. The detent is normally held in active position by a leaf spring 38 which is secured at one end, as at 39, to the disc 29 and has its free end arranged in contact with the detent. The detent 33 is provided at its outer or free end with a lug 40 through the medium of which it may be moved into inactive position against the tension of the spring 38 by means hereinafter described.

A roller 41 is fixed to the shaft 25 in alinement with the slot 13 in the top plate 9. The roller 41 is provided with a peripheral recess 42 and with a peripheral groove 43 which extend longitudinally therethrough. A knife bar 44 has its inner portion arranged in the groove 43, and is secured to the roller 41 by elements 45. The knife bar 44 extends longitudinally of the roller 41 and extends radially therefrom, and cooperates with an anvil roller 46 to cut the fabric strip 47 into belt loop blanks or straps. The anvil roller 46 is located below the top plate 9 in alinement with the knife roller 41, and it is loosely mounted upon a shaft 48 which is journaled at its ends in bearing blocks 49. The bearing blocks 49 extend downwardly from the top plate 9 at opposite sides of the slot 13 in said plate.

A feed roller 50 having a toothed periphery is loosely mounted upon the shaft 21 in alinement with the opening 12 in the top plate 9, and the upper peripheral portion of the roller is arranged within the opening. The feed roller 50 is connected to the shaft 21 for rotation thereby through the medium of an annular ratchet 51 fixed, as at 52, to the shaft, and a pawl 53 pivoted intermediate its ends, as at 54, to the feed roller. The pawl 53 is normally held in engagement with the ratchet 51 by a spring 55 which is fixed at one end, as at 56, to the feed roller 50 and has its free end arranged in contact with the pawl. The pawl 53 is fixed to one end of its pivot 54, and the pivot extends longitudinally through the feed roller 50 and is provided at its other end with a crank 57 through the medium of which the pawl may be retracted from engagement with the ratchet 51 by means hereinafter described.

A standard 58 extends upwardly from the top plate 9 at one side of the opening 12 in said plate, and it is secured at its lower end to the plate, as at 59. The standard 58 is provided with horizontal arms 60 which are arranged one above the other and in parallel relation to the upper side of the feed roller 50. A vertical presser bar 61 is slidably mounted in openings 62 in the arms 60, and it is held against turning movement by a screw 63 carried by one of the arms and engaging in a vertical slot 64 in the bar. A presser foot 65 is pivotally connected, as at 66, to the lower end of the bar 61, and it is located directly above the feed roller 50. The strip 47 passes between the feed roller 50 and the presser foot, and the presser foot is under constant urge in the direction of the feed roller by a spring 67 to hold the strip in proper contact with the feed roller. The spring 67 is secured at its lower end, as at 68, to the standard 58, and at its upper end, as at 69, to one end of a lever 70. The lever 70 is pivoted near its other end, as at 71, to a standard 72 extending upwardly from the upper arm 60. The lever 70 extends across the upper end of the presser bar 61, and a screw 73 adjustably carried by the lever contacts with the upper end of the presser bar. The pivot 71 of the lever 70 is arranged at one side of the presser bar 61, the spring 67 is connected to the lever at the opposite side of the presser bar, and the screw is located between the pivot and the point of connection between the spring and lever, with the result that the power of the spring is utilized to constantly urge the presser bar and presser foot 65 in the direction of the feed roller 50.

During the operation of the machine, the feed roller 50 is rotated in a clockwise direction and the knife roller 41 in a counter-clockwise direction. The fabric strip 47, which may be wound about a rotatable drum or spool, is fed forwardly by the feed roller 50 between the knife roller 41 and anvil roller 46. During the rotation of the knife roller, the knife bar 44 severs the strip into belt loop blanks and non-usable portions. The knife bar 44 moves into engagement with the strip 47 at a point slightly in rear of the vertical axis of the anvil roller 46, and severs the strip when it is in alinement with said axis of the roller. The belt loop blanks are terminally sewed to the waist bands of trousers for the purpose of providing belt receiving loops and the non-usable portions are discarded. The length of the belt loop blanks will depend upon the relative speeds of the feed roller 50 and knife roller 41, and by changing the ratio of the gears 23 and 24, blanks of the required length may be cut.

A receptacle, not shown, for the belt loop blanks, will be arranged below the machine and to the right of the vertical longitudinal center of the machine as viewed in Figure 7. The blanks are directed into the receptacle by a sorter or director plate 74 which is pivoted intermediate its ends and arranged in an inclined position in the frame 1 and in the path of the blanks as they fall from the cutting mechanism, consisting of the roller 41, knife bar 44 and anvil roller 46. The plate 74 extends from a point at the left hand side of the cutting mechanism to a point at the right hand side thereof, and it is pivotally connected near its lower edge to the frame bars 7 by pintles 75 and 76.

The plate 74 is releasably held in this position against the tension of a spring 77 by means which comprises a latch bar 78 pivoted at one end, as at 79, to the side plate 6, and a bolt 80 carried by the front edge of the sorter plate and engaging in a notch 81 in the latch bar (see Figure 3). The latch bar 78 is inclined upwardly from its pivot 79 across the front end of the frame 1 and rests upon the bolt 80 and it is yieldingly maintained in engagement with the bolt by a leaf spring 82 which is fixed at one end, as at 83, to the frame bar 8 and bears at its free end upon the latch bar.

The operations of the knife bar 44 and the feed roller 50 are under the control of means which insure the cutting of the belt loop blanks solely from the usable parts of the strip 47 and with the minimum of waste. The means for controlling the operation of the knife bar 44 comprises a detent 84 which is pivoted at its lower end, as at 85, to the side plate 6 and has an angular upper terminal 86, an electromagnet 87 secured, as at 88, to the side plate 6, an armature lever 89 fixed at one end to the pivot 85 and having its free end arranged below the magnet, and a switch 90 for the magnet. The detent 84, which is operable to position its angular end 86 in or out of the path of the movement of the lug 40 on the detent 33, is normally held in an inactive position by a spring 91, and is adapted to be moved into active position by the magnet 87. The switch 90 comprises a fixed contact 92 which is secured to and insulated from the top plate 9, and a movable contact 93 which is carried by and electrically connected to the lower end of an arm 94 fixed at its upper end to the short arm of the lever 70, the contacts being normally held in spaced or opened relation by the spring 67.

A socket 95 has its contact 96 connected by a conductor 97 to one terminal of the coil of the magnet 87, and has its contact 98 grounded by a conductor 99 to the frame 1. The other terminal of the coil of the magnet 87 is connected by a conductor 100 to the contact 92. The contact 93 is grounded to the frame 1 through the lever arm 94. Conductors 101 connected to the contacts 96 and 98 are provided with a plug 102 adapted to be engaged in an electric outlet socket to provide current for the operation of the magnet 87.

The switch 90 is adapted to be closed by the passage of a thickened portion of the strip 47 beneath the presser foot 65, and is adapted to be opened after the passage of said portion beyond the presser foot. Upon the closing of the switch 90, the detent 84 is moved into active position by the magnet 87, and upon the opening of the switch, the detent is moved into inactive position by its spring 91.

When a thickened portion of the strip 47 passes beneath the presser foot 65, an upward movement is imparted to the presser foot and presser bar 61, and such movement of the presser bar swings the lever arm 94 in a direction to carry the contact 93 into engagement with the contact 92, with the result that the magnet 87 is energized to effect the movement of the detent 84 into active position. When the detent 84 is in this position, and the detent 33 is in position to permit its lug 40 to engage the angular end 86 of the detent 84, the detent 33 is actuated to release the knife roller 50 from driving engagement with the gear 24.

The passing of the thickened portion of the strip 47 forwardly beyond the presser foot 65 permits the presser foot to be moved downwardly by the spring 67 which at the same time moves the lever arm 94 in a direction to carry the contact 93 out of engagement with the contact 92, with the result that the magnet 87 is de-energized to effect the release of the detent 84 for movement into inactive position by its spring 91. When the detent 84 is returned to its inactive position, the clutch detent 33 is released and the driving engagement between the feed roller 50 and the gear 24 is re-established.

The means for controlling the operation of the feed roller 50 comprises a cam collar 103 slidably mounted on the shaft 21 for movement into and out of contact with the crank 57 of the pawl 53. It is normally held out of contact with the crank 57, and against the tension of a spring 104 by a latch 105. The spring 104 is of the coil type, and is arranged on the shaft 21 between the cam collar 103 and the adjacent bearing 22. The latch 105 is pivoted, as at 106, to the inner surface of the side plate 6 and engages an annular flange 107 on the cam collar 103. When the latch 105 is retracted, the cam collar 103 is released for movement by the spring 104 into contact with the crank 57. The contact of the cam collar 103 with the crank 57 swings the pawl 53 out of engagement with the ratchet 51, with the result that the movement of the feed roller 50 is arrested. The latch 105 is retracted through the medium of a lever 108 which is under the control of the detent 84 and which extends forwardly and rearwardly of the frame 1 and is supported between its ends for pivotal movement about a vertical axis 109. The rear end of the lever 108 is arranged in operative relation to the lower end of an arm 110 extending downwardly from the pivot end of the latch 105.

The lever 108 is provided in its front end with a recess 111 which receives the upper end of an arm 112 by which it is connected to the detent 84 and which is secured at its lower end to the inner end of the pivot 85 of the detent. The recess opens out through the outer edge of the lever 108, and lugs 113 and 114 extend into the recess from the front and rear walls thereof, the lug 113 being spaced inwardly from the lug 114 and having a curved outer edge, (see Figure 13).

When the detent 84 is in inactive position, the upper end of the arm 112 engages the lug 113 and holds the lever 108 against movement under the influence of a spring 115 which is secured to the side plate 5 and to the lever at a point forwardly beyond the pivot 109. When the detent 84 is moved into active position by the magnet 87, the arm 112 moves into engagement with the lug 114 and holds the lever 108 against movement by the spring 115. When the detent 84 is released by the magnet, and during its movement into inactive position by its spring 91, the arm 112 is moved forwardly into contact with the outer side of the lug 113, with the result that the lever 108 is released for actuation by the spring 115. This actuation of the lever 108 retracts the latch 105, and the retraction of the latch releases the cam collar 103 which is moved into contact with the crank 57 by the spring 104, with the result that the pawl 53 is moved out of engagement with the ratchet disc 51 and the feed roller 50 comes to rest.

The means for controlling the operation of the feed roller 50 is in turn controlled by a lever 116 (see Figure 5) which is pivotally supported at a point between its ends, as at 117, and a cam 118 fixed to the shaft 25. The lever 116 occupies a horizontal position between the top plate 9 and the shaft 25, and extends forwardly and rearwardly of the frame 1. Its front end is arranged in the path of the cam 118, and it is provided at its rear end with a downwardly extending arm 119 which contacts with the inner side of a pin 120 (see Figure 1) extending rearwardly from a bar 121.

The bar 121 is arranged in a horizontal position at the rear end of the frame 1 and is supported for sliding movement by bearings 122. An arm 123 extends forwardly from the bar 121 and engages in the groove of the cam collar 103. After the knife bar 44 severs the strip 47 immediately in rear of a thickened portion 47a of the strip, the cam 118 contacts with the rear end of the lever 116. The resulting operation of the bar 121 moves the cam collar 103 away from the crank 57 and in the direction of the latch 105. The cam collar 103 is thus moved against the tension of the spring 104, and when it reaches the limit of its movement, it is engaged by the latch 105 to hold it in inactive position against the tension of the spring, and thus permit the blank cutting operation of the machine to continue until another thickened portion of the strip 47 passes beneath the presser foot 65.

The lever 116 and cam 118 are also employed to return the lever 108 into latch releasing position, and when the lever is returned to this position, the upper end of the arm 112 engages in the recess 111. This lever is moved into this position immediately before the cam collar 103 is moved into a position to be engaged by the latch 105, and this lever is moved into this position against the tension of the spring 115 so that when it is again released, it will retract the latch. Connection between the lever 108 and the lever 116 is established through the medium of a lever 124 and a link 125.

The lever 124 is arranged outwardly of the side plate 6 in a substantially upright position, see Figure 1, and is pivoted intermediate its ends, as at 126, to said plate. The upper end of the lever is arranged in the path of the movement of a cam 127 extending laterally outward from the lever 116, see Figure 5, and movable in an outward direction when the lever is actuated by the cam 118. The link 125 passes through a guide opening 128 in the side plate 6, it is pivoted at its outer end, as at 129, to the lower end of the lever 124, and it is provided at its inner end with a fork 130 for the reception of the rear end of the lever 108. The fork 130 permits the lever 108 to be moved when released under the influence of the spring 115 without imparting any movement to the link 125 and lever 124. The pivot 126 for the lever 124 is carried by a bracket 131 secured to the outer surface of the side plate 6 and provided with an opening 132 for the reception of the adjacent bearing 22.

When a thickened portion of the strip 47 passes beneath the presser foot 65, the operation of the knife bar roller 41 or the operation of the feed roller 50, one or the other, will be interrupted, and which part is interrupted in its operation will depend upon the angular position of the knife bar with respect to the strip at the instant that a thickened portion of the strip is about to pass beneath the presser foot. If the knife bar 44 is in the position "A" in which it is shown in Figure 17, then when a thickened portion of the strip 47 passes beyond the presser foot 65, the operation of the feed roller 50 will be interrupted at the instant the thickened portion has passed beyond presser foot, and remains interrupted until the knife bar reaches the position "B" of this figure. When the knife bar 44 reaches position "B", (the thickened portion having passed forwardly beyond the presser foot 65,) the operation of the feed roller 50 will be re-established by the cam 118 so as to cause the knife bar to sever the strip close to the rear end of the thickened portion. When the knife bar 44 is in the position "A", the clutch detent 33 will not have moved up to the point where its lug 40 can be engaged by detent 84, and the cam 118 will be out of contact with the lever 116, and in view thereof, the operation of the knife will not be interrupted but the operation of the feed roller 50 will be interrupted when the thickened portion 47a passes beyond the presser foot 65. When the knife bar reaches the position "B", the cam 118 contacts with the front end of the lever 116, the consequent rocking movement of the lever re-establishing the operation of the feed roller 50.

If the knife bar 44 is in the position "B" when a thickened portion of the strip 47 passes from beneath the presser foot 65, the operation of the knife bar will be interrupted when the knife roll has reached the position shown in Figure 4 and until the strip has been fed far enough to permit the further operation of the knife bar to sever the strip close to the rear end of the thickened portion, and when this occurs, the thickened portion is beyond the presser foot 65 and the operation of the knife bar is re-established to permit the severing of the strip at this point. When the knife bar is in the position "B", the clutch detent 33 is in a position to permit its lug 40 to be engaged by the detent 84 on the passage of a thickened portion beneath the presser foot 65, and the cam 118 is in contact with the end of the lever 116, with the result that the operation of the knife bar is interrupted while the operation of the feed roller 15 is not interrupted when a thickened portion passes beneath the presser foot 65.

It will thus be understood that the operation of the knife bar 44 and the feed roller 50 are so timed and controlled that the belt loop blanks will be cut only from the usable portions of the strip 47 and that substantially the entire length of every usable portion is utilized in the formation of the blanks. After the operation of the knife bar 44 or the operation of the feed roller 50 has been re-established, these parts will continue to operate until another thickened portion of the strip 47 passes beneath the presser foot 65 when the operation of one of these parts will be again interrupted.

A receptacle, not shown, is provided for the severed thickened portions of the strip 47, and it may be arranged below the machine and to the left of the longitudinal vertical center thereof in Figure 3. The sorter plate 74 functions not only to direct the belt loop blanks into the receptacle provided therefor as heretofore stated but also functions to direct the severed thickened portions into the receptacle provided therefor. When it is in the position in which it is shown in Figure 1 and in the position in which it is shown by solid lines in Figure 7, the sorter plate 74 functions to direct the belt loop blanks into their receptacle. When it is in the position in which it is shown by broken lines in Figure 7, the sorter plate is in position to direct the severed thickened portions into their receptacle.

The sorter plate 74 is releasably held in its belt loop blank directing position by the latch lever 78, and it is held in this position against the tension of the spring 77. The latch lever 78 is retracted simultaneously with the movement of the detent 84 into active position as the result of a thickened portion of the strip 47 passing beneath the presser foot 65. The retraction of the latch lever 78 is effected through the medium of an armature 133 secured to the pivoted end of the latch lever and arranged at the upper side of the magnet 87. The retraction of the latch lever 78 releases the sorting plate 74 which, however, is held against movement into its thickened portion directing position by a bolt 134 slidably carried by the upper rear frame bar 8 (see Figure 14) and arranged in the path of the movement of a catch 135 carried by the sorter plate 74.

The catch 135 is pivoted, as at 136, to the sorter plate 74, and it is yieldingly held in projected position by a spring 137. The bolt 134 is carried by an angular rod 138. The horizontal arm 139 of the rod 138 is slidably mounted in bearings 140, as shown in Figure 4, carried by a bracket plate 141 secured, as at 142, to the upper sides of the top plate 9. The inclined arm 143 of the rod 138 is arranged at the front end of the machine and connected directly to the bolt 134. The bolt 134 is yieldingly held in projected position by a coil spring 144 which is mounted on the rod arm 139 between one of the bearings 140 and a collar 145 fixed to this rod arm. The spring 144 exerts a rearward tension on the rod 138 and moves the front end of the rod arm 139 in contact with a cam 146 fixed to the knife shaft 25.

When, as the result of a thickened portion of the strip 47 passing beneath the presser foot 65, the detent 84 is moved into active position, the latch lever 78 is retracted to release the sorting plate 74 for movement into contact with the bolt 134. Although the sorter plate 74 has been moved, it is still in position to direct into the receptacle provided therefor, the belt loop forming blank cut from the strip 47 immediately in advance of the thickened portion of the strip. Immediately before the knife bar 44 severs the strip 47 in rear of the thickened portion, the cam 146 moves the rod 138 rearwardly, with the result that the bolt 134 is retracted and the sorter plate 74 freed for movement by the spring 77 into position to direct the thickened portion of the strip into the receptacle provided therefor.

The magnet 87 is de-energized prior to the movement of the sorter plate 74 into this position, and the latch bar 78 is supported in retracted position by a catch 147 (see Figure 15) until the latch bar reaches this position. The catch 147 is pivoted, as at 148, to the inner surface of the side plate 5 and is normally held in active position by a latch spring 149. Immediately before the sorter plate 74 reaches its dotted line position, Figure 7, it contacts with the catch 147 and moves it against the tension of the spring 149 into latch lever releasing position, and when the latch lever is released, it again moves downwardly into contact with the bolt 80 carried by the sorter plate.

After the thickened portion of the strip 47 has been directed into the receptacle provided therefor, the sorter plate 74 is returned to its belt loop blank directing position, and it is returned to this position by a two phase movement in order to insure the disposing of the thickened portion in its receptacle and to insure its return to belt loop blank disposing position prior to the cutting of the next belt loop blank after the severing of the thickened portion. The sorter plate 74 is returned to its belt loop blank directing position by a disc 150 fixed to the front pintle 76 of the sorter plate and provided with closely related peripheral notches 151 and 152, and a pawl 153 pivoted at one end, as at 154, and having its free end arranged for engagement with the notches in the disc.

The pawl 153 is pivoted to a bar 155 which is horizontally arranged at the rear end of the frame 1 and slidably supported by bearings 156. The pawl 153 is maintained in active position by the gravity actuated lever 157 which is connected at one end to the pivot 154 and has a pin 158 contacting with the upper side of the pawl inwardly beyond the pivot. The pawl 153 is arranged forwardly beyond the disc 150 and is provided with an angular end 159 for engagement in the notches 151 and 152. The lever 157 is arranged forwardly beyond the disc 150 and extends inwardly beyond the pawl 153 and disc. When the pawl 153 is in engagement with either of the notches 151 and 152, it is supported by the disc 150 and in turn supports the lever 157.

A leaf spring 160, secured at one end, as at 161, to the lever 157, has its free end arranged in contact with a pin 162 extending forwardly from the pawl 153 near the free end of the latter. When the sorter plate 74 is in belt loop blank directing position, the pawl 153 is supported in inactive position so as to permit the sorter plate to be moved into thickened portion directing position, and this is accomplished through the medium of the lever 157 and a lever 163 which is pivoted at its lower end, as at 164, to a bracket arm 165 extending downwardly from the rear frame bar 7. The lever 163 is provided at its upper end with a forwardly directed finger 166 which engages the lower side of the free end of the lever 157 to effect the supporting of the pawl 153 in inactive position. The lever 163 is held in pawl supporting position by a spring 167, and it is moved from this position into pawl releasing position by a link 168 which is pivotally connected at one end, as at 169, to the lever and at the other end to the disc 150 by a wrist pin 170, the wrist pin being carried by the disc and arranged in a slot 171 extending longitudinally of the lever.

After the movement of the sorting plate 74 into thickened portion directing position, the lever 163 is moved into pawl releasing position, with the result that the pawl is in position to return the sorting plate to belt loop blank directing position after a thickened portion has been severed from the strip 47 and directed into the receptacle therefor. The pawl 153 is actuated to effect the return of the sorter plate 74 to belt loop blank directing position by means which comprises a shaft 172 which is journaled in bearings 173 secured to the outer surface of the side plate 5.

The shaft 172 extends parallel to the sides of the frame 1 and is provided at its rear end with an arm 174 which is engaged, as at 175, with the adjacent end of the slide bar 155. The shaft 172 is provided at its front end with an arm 176 to the free end of which a plunger 177 is pivotally connected, as at 178. The plunger 177 is supported by a guide 179 which is secured to the outer surface of the side plate 5 and is arranged in alinement with a cam 180 fixed to the knife shaft 25. The cam 180 is so related to the knife bar 44 that, after the strip 47 is severed immediately in rear of the thickened portion thereof, it moves the plunger 177 downwardly. This movement of the plunger results in the pawl 153, which is now in engagement with the notch 151 of the disc 150, being actuated to move the sorter plate 74 through the first phase of its movement from thickened portion directing position to belt loop blank directing position. After the cam 180 moves into plunger releasing position, the pawl 153 is returned to its normal position by a spring 181, which is secured at one end to the shaft arm 174 and at its other end to a bracket arm 182 extending outwardly from the side plate 5. During the first actuation thereof, the pawl 153 engaged the notch 151 of the disc 150. The sorter plate 74 is held in the position into which it was moved, against the tension of the spring 77 by the latch lever 78, the bolt 80 of the sorter plate engaging in the notch 183 of the latch lever. The sorter plate 74 is held in this position until the knife bar 44 severs the strip immediately in rear of the thickened portion, and until after the thickened portion is directed by the sorter plate into the receptacle therefor.

Immediately after this takes place, the cam again moves the plunger 177 downwardly, with the result that the pawl 153, which is now in engagement with the notch 152, is moved to carry the sorter plate 74 through the second phase of its movement from its thickened portion directing position to its belt loop blank directing position, the sorter plate being held in this position by the latch lever 78 until a thickened portion of the strip again passes beneath the presser foot 65. The function of the lever 163 is to support, through the medium of the lever 157, the pawl 153 in an inactive position at such time as the sorter plate 74 is being moved from its belt loop blank directing position into its thickened portion directed position. The lever 63 is normally held in position to support the pawl 153 in an inactive position by the spring 167. During the first phase of the movement of the sorter plate 74 into thickened portion directing position, the pin 170 moves in the slot 171 with the result that the lever 163 is not moved from its pawl supporting position. During the second phase of the movement of the sorter plate 74 into this position, the pin 170 moves the link 168 in a direction to carry the lever 163 into pawl releasing position, so that the pawl may assume an active position with respect to the disc 150 to effect the return of the sorter plate to belt loop blank directing position after a thickened portion of the strip 47 has been severed and directed into the receptacle therefor. During the movement of the sorter plate 74 to its belt loop blank directing position, the latch 135 yields readily on contact with the bolt 134, and due thereto, the bolt will not prevent the sorter plate from returning to this position.

The strip 47 is directed to the feed roller 50 and presser foot 65 by guides 183 which are secured by screws 184 to the upper side of the top plate 9 and rearwardly of the presser foot 65, the guides being provided with elongated slots 185 to permit them to be adjusted toward and away from each other so as to adapt the machine for cutting belt loop blanks from fabric strips of different widths.

The electric motor for operating the machine, which is diagrammatically illustrated in Figure 11 and designated 186, is under the control of a switch 187 which is mounted upon a fixed, supporting arm 188 extending in the upper end of a standard 189. The standard 189 is secured, as at 190, to the upper side of the top plate 9 at the right hand side of the presser bar 61. The switch 187 comprises a rigid arm 191 and a spring arm 192, the former being connected to the motor 186 by a lead 193 and the latter being connected by a lead 194 to a source of current which for the purpose of illustration is shown as a battery 195. The arm 192 is located below the arm 191 and constantly tends to move downwardly and away therefrom. A disc 196 is pivotally mounted, as at 197, to the upper end of the standard 189, and is provided with a lug 198 which, when the disc is moved upwardly in one direction, contacts with the arm 192 and carries it into contact with the arm 191, the disc being provided with an operating handle 199. A latch lever 200 which is pivoted intermediate its ends, as at 201, to an arm 202 by the standard 189, is adapted to engage a lug 203 on the disc 196 to hold the arm 192 in contact with the arm 191, and thus maintain the switch 187 closed.

The latch lever 200 is arranged in an upright position, and the upper end thereof engages the lug 203. The lower end of the latch lever 200 is arranged opposite the lower end of the lever arm 94. The downward pressure of the arm 192 against the lug 198 tends to constantly move the lug 203 against the latch lever 200, with the result that the latch lever is held against accidental disengagement with the lug 203. While any portion of the strip 47 is located below the presser foot 65, the lever arm 94 is held out of contact with the latch lever 200, and it is free to move in a direction to open the switch 90 without contacting with the lower end of the latch lever. When, however, the end of the strip 47 passes beyond the presser foot 65, the lever arm 94 is freed for movement by the spring 67 into contact with the lower end of the latch lever 200. The consequent locking of the latch lever 200 moves it out of engagement with the lug 203, with the result that the arm 192 is freed for movement away from the arm 191. This movement of the arm 192 opens the switch 187 with the result that the operation of the machine ceases. After a new strip has been placed beneath the presser foot 65, and the switch 187 closed by manually rotating the switch disk 196, the machine will continue to function until the end of the strip is reached when it will again be automatically stopped.

The specific operation of this mechanism has been stated in detail in the course of the description of the various parts. The general operation of the mechanism, however, is as follows:—

So long as the strip 47 is of one thickness, the knife roll 41 and the feed roll 50 rotate continuously to cut off strips of uniform length but when a thickened portion of the strip arrives beneath the presser foot 65, it lifts the presser foot. This action, through the electro-magnet 87, throws the detent 84 into position to be engaged by the lug or tooth 40 (see Figure 4) and this will, of course, stop the action of the cutting roll 41 provided that the cutting roll is in a position where the lug 40 can immediately engage with the detent 84. While the thickened portion of the strip is beneath the presser foot, the feed roll 50 will continue its movement until the thickened portion has been carried just beyond the presser foot. At this point, the strip must either be advanced while the knife roll is stopped, or else the strip must be held from advancement by stopping the feed roll until the roll 41 has reached such a position that the knife is in the position B in Figure 17. In order to hold the strip from further movement until the knife reaches the position B in Figure 17, it is necessary that the feed roll shall be stopped. This stoppage of the feed roll, under these circumstances, is secured by the following action:—

Figure 13:
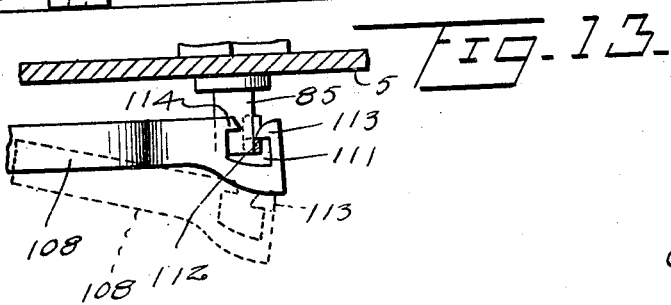
Figure 13 is a detailed sectional view taken on the horizontal plane indicated by the line 13—13 of Figure 6.

When the magnet 87 is energized, it shifts the arm 112 in Figures 6 and 13 toward the left and the arm 112 will pass from beneath the tooth 113 to a point beneath the tooth 114, and as soon as the thickened portion of the strip has passed from beneath the presser foot, the presser foot will drop, breaking the circuit through the magnet 87 and this will cause the shaft 85 to move toward the left in Figure 4 or toward the right in Figure 5 and thus the arm 112 will seek to return to its initial position. The tooth 113 is lower than the tooth 114 so that the arm 112, when it moves to the right in Figure 13, will escape the tooth 113 and the arm 108 will be shifted to the dotted line position in Figure 13. This will cause the release of the latch 105 (see Figure 8) which will immediately cause the cam 103 to engage against the crank 57 disconnecting the feed roll 50 from its shaft 57. The feed roll will thus stop and it will remain stopped until the cam 118 engages the lever 116 and through the elements 119 and 123 acts to return the cam 103 to a position where it may be engaged once more by the latch 105. Thus if at the time the thickened portion of the strip 47 (see Figure 17) passes beyond the presser foot 65, the knife is at the position A, the feed roller 50 will remain still until the knife reaches the position B. Just prior to the arrival of the knife to the position B, the cam 118 will again operatively connect up the feed roller with the shaft and the strip will be fed forward coincidently with the rotation of the knife roll so that the knife will operate to sever the strip immediately behind the thickened portion.

If the knife 44 be in the position A, the detent lug 40 will be approximately diametrically across from the knife and will be in a position to be engaged by the detent 84 at the moment that the presser foot is lifted by the thickened portion. This, however, does not affect the feed roll which will cause the travel of the strip beneath the presser foot until the thickened portion of the strip has passed the presser foot. Then, of course, the knife roll is released but coincidently the feed roller is stopped until the roller reaches the position where the knife 44 is at B as heretofore described.

During the period when the strip is moving from beneath the presser foot and the knife bar carrying roller 41 and is being cut up into suitable lengths, the sorter plate 74 is in the position shown in full lines in Figure 7 so as to direct the usable strips into their proper receptacle, but as soon as the presser foot rises through engagement with the thickened portion 47a of the strip, the latch lever of the sorter plate is retracted by magnet 87 and the sorter plate shifts to the dotted line position in Figure 14. Then, upon a retraction of the bolt 134 due to cam 146, the sorter plate is fully shifted to the dotted line position in Figure 7 where it will direct the thickened portion of the strip which has been cut off into the proper receptacle therefor. The latch lever 78 which is swung upward is supported by the catch 147, (see Figure 15) and just before the sorter plate reaches this dotted line position in Figure 17, it releases the latch 149 and permits the latch lever 78 to drop down ready to again hold the sorter plate when it is moved back to the full line position shown in Figure 7. The sorter plate is retracted to the full line position shown in Figure 7 where it will direct the usable blanks into their receptacle by means of the cam 180 (see Figure 7) operating upon the pin 177 and rotating the shaft 172 to shift the bar 155 through the action of the pawl 153, oscillating the sorter plate from the dotted line position in Figure 7 to its full line position.

It will thus be seen that the action of the sorter plate is automatically to discharge the usable blanks into their proper receptacle and the unusable thickened portions into their proper receptacle. Whenever, the end of the strip 47 is reached, the motor will be automatically stopped by the release of the lever 200 through the action of the presser foot 61 on the arm 94. This permits the switch blades 192 and 191 to open, breaking the circuit of the motor. When a new strip has been inserted and is ready for feeding forward, the operator simply shifts the switch blades 191 and 192 to their closed position by rotating the disk 196 by means of the handle 199 to the position shown in Figure 11, whereupon the latch lever 200 will automatically engage the disk and hold the parts in this position.

While I have described the principle of the invention, together with the structure which I now consider the preferred embodiment thereof, it is to be understood that the structure shown is merely illustrative and that such changes may be made, when desired, as fall within the scope of the invention as claimed. It is also to be understood that the machine is adapted to cut into equal lengths strips of textile, leather or any other comparatively easily severed material, that the cut lengths may be used for other purposes than belt loop forming blanks, and that the machine will function efficiently whether the strip being cut is or is not provided with thickened portions.

I claim:—

1. A machine for cutting blanks from a strip of material, comprising a rotatably supported knife, a member for supporting the strip while being cut, a feeding roller adapted to advance the strip between the knife and member, a spring urged presser foot adapted to hold the strip against the feed roller, and means for operating the knife and feed roller.

2. A machine for cutting blanks from a strip of material having non-usable portions spaced at different distances apart throughout the length thereof, comprising cutting means, means for feeding the strip to the cutting means, means for operating said cutting and feeding means, and means adapted to be actuated by said portions for controlling the operation of said cutting and feeding means to effect the cutting of the blanks from the other portions of the strip.

3. A machine for cutting blanks from a strip of material having non-usable portions spaced at different distances apart throughout the length thereof, comprising cutting means, means for feeding the strip to the cutting means, means for operating said cutting and feeding means, means actuated by said nonusable portions controlling the operation of said cutting and feeding means to effect the cutting of the blanks from the other portions of the strip, and means for separating the blanks and severed non-usable portions from each other.

4. A machine for cutting blanks from a strip of material having usable and non-usable portions, comprising cutting means, means for feeding the strip to the cutting means, means for operating said cutting and feeding means, means bearing against the strip in advance of the cutting means and actuated variably by said usable and nonusable portions and controlling the operation of said cutting and feeding means to effect the cutting of the blanks from the usable portions of the strip and to effect the severing of the non-usable portions from the strip close to the rear ends of such portions, and means for separating the blanks and non-usable portions.

5. A machine for cutting blanks from a strip of material having usable and non-usable portions of different thickness with relation to each other, comprising cutting means, means for feeding the strip to the cutting means, means for operating said cutting and feeding means, means bearing against the strip and operated by the differences in thickness between the usable and unusable portions of the strip controlling the operation of said cutting and feeding means to effect the cutting of the blanks from the usable portions of the strip, a sorter member adapted to occupy a blank directing position and a non-usable portion directing position, means releasably holding said member in said first position during the cutting of the blanks, means for moving said member into said second position during the severing of a non-usable portion, and means for returning said member to said first position after the severing of a non-usable portion.

6. A machine for cutting blanks from a strip of material having usable and non-usable portions, comprising cutting means, means for feeding the strip to the cutting means, means for operating said cutting and feeding means, means for controlling the operation of said cutting and feeding means to effect the cutting of the blanks from the usable portions of the strip, a sorter member adapted to occupy a blank directing position and a non-usable portion directing position, a latch holding said member in said first position during the cutting of the blanks, means under the control of a non-usable portion for retracting the latch, means for moving said member into said second position after the retraction of the latch, and means for returning said member to said first position after the severing of a non-usable portion.

7. A machine for cutting blanks from a strip of material having usable and non-usable portions, comprising cutting means, means for feeding the strip to the cutting means, means for operating said cutting and feeding means, means for controlling the operation of said cutting and feeding means to effect the cutting of the blanks from the usable portions of the strip, a sorter member adapted to occupy a blank directing position and a non-usable portion directing position, a latch holding said member in said first position during the cutting of the blanks, a normally opened switch under the control of the non-usable portions and adapted to be closed on a non-usable portion being engaged by the feeding means, an electric responsive member in circuit with the switch and adapted on the closing of the switch to retract the latch, means for moving said sorter member into said second position after the retraction of the latch, the switch being adapted to open after a non-usable portion has passed beyond the feeding means, and means for returning said sorter member to said first position after the opening of the switch.

8. A machine for cutting blanks from a strip of material having usuable and non-usable portions, comprising cutting means, a feed roller, a presser foot for holding the strip in engagement with the feed roller, a pivoted lever, means connecting the lever to the presser foot, a spring connected to the lever and urging the presser foot in the direction of the feed roller, a sorter member adapted to occupy a blank directing position and a non-usable portion directing position, a latch holding said member in said first position during the cutting of the blanks, a normally opened switch under the control of the lever and adapted to be maintained open during the passage of the usable portions beneath the presser foot and adapted to be maintained closed during the passage of the non-usable portions beneath the presser foot, an electric responsive device in circuit with the switch and adapted on the closing of the switch to retract the latch, means for moving said sorter member into said second position after the retraction of the latch, means for returning said sorter member to said first position after the opening of the switch, and means for operating the feed roller and cutting means.

9. A machine for cutting blanks from a strip of material having non-usable portions spaced at different distances apart throughout the length thereof, comprising cutting means including a rotatable blade, means for feeding the strip to the cutting means, means for operating said cutting and feeding means, and means under the control of a non-usable portion for arresting the operation of the cutting means when the non-usable portion is at a predetermined point from the cutting means and when the blade is in a predetermined angular position with respect to the strip, the means under the control of the non-usable portion being adapted to release the cutting means for operation after said portion has passed beyond said point, the arresting and releasing of the cutting means securing required registration of the blade with the point of the strip to be cut in rear of said portion.

10. A machine for cutting blanks from a strip of material having non-usable portions, comprising cutting means including a rotatable blade, means for feeding the strip to the cutting means, means for operating said cutting and feeding means, and means under the control of a non-usable portion for arresting the operation of the feeding means when the non-usable portion is at a predetermined point from the cutting means and when the blade is in a predetermined position with respect to the strip, the means under the control of the non-usable portion being adapted to release the feeding means for operation after said portion has passed beyond said point, the arresting and releasing of the feeding means securing required registration of the blade with the point of the strip to be cut in rear of said portion.

11. A machine for cutting blanks from a strip of material having usable and non-usable portions comprising cutting means including a blade, means for operating said cutting means and including a normally engaged clutch, means for feeding the strip to said cutting means, means connecting said feeding means to said operating means and including normally engaged ratchet elements, means under the control of the feeding means for disengaging the clutch while a non-usable portion is engaged by said feeding means and when the blade is in a predetermined position with respect to the strip, and means under the control of said cutting mechanism for disengaging said ratchet elements when a non-usable portion is engaged by said feeding means and when the blade is in another predetermined position with respect to the strip.

12. A machine for cutting blanks from a strip of material having usable and non-usable portions, comprising cutting means including a blade, means for feeding the strip to said cutting means, means for operating said cutting means and including a normally engaged clutch, means for connecting said feeding means to said operating means and including normally engaged ratchet elements, a sorter member adapted to occupy a blank directing position and a non-usable portion directing position, a latch holding said member in said first position during the cutting of blanks from the usable portions, means adapted to disengage the clutch or ratchet elements and retract the latch while a non-usable portion is engaged by said feeding means, means for moving said sorter member into said second position after the retraction of the latch or ratchet elements, and means for returning said sorter member to said first position and engaging the clutch or ratchet elements.

13. A machine for cutting blanks from a strip having usable and nonusable portions, comprising cutting means, means for feeding the strip to the cutting means, means for operating said cutting and feeding means, means for arresting the operation of the cutting means when a nonusable portion occupies a certain position with respect to the cutting means, and means for arresting the operation of the feeding means when such portion passes a certain distance beyond said position.

14. A mechanism for cutting blanks from a strip having usable and nonusable portions different in thickness from each other, the unusable portions being spaced different distances apart, comprising a rotatable cutting means, a controlling member bearing on and supported by the strip, means feeding the strip to the cutting means, the movement of the controlling member under variations in thickness of the strip acting automatically to stop the rotation of the cutting means for a predetermined time until the strip has been moved a predetermined distance by the feeding means and stop the feeding means for a predetermined time until the knife has moved to a predetermined position with reference to the strip.

15. A machine for cutting blanks from a strip having nonusable portions thicker than the usable portions comprising a rotatable cutting means, a presser foot in advance of the cutting means and bearing against the strip, a feed roller disposed below the presser foot, means for operating the rotatable cutting means and the feed roller, means for arresting the operation of said cutting means when a thick portion of the strip engages the presser foot and when the cutting means is in a predetermined angular position with relation to the work, and means for arresting the operation of the feed roller when the thick portion of the blank has passed the presser foot and until the blade has reached a predetermined position.

16. A machine for cutting blanks from a strip having nonusable portions thicker than the usable portions of the strip, including a rotatable blade, a presser foot in advance of the blade and bearing against the strip, a feed roller disposed in advance of the blade, means actuated automatically by the lifting of the foot by a thick portion of the strip acting to stop the blade when it has reached a predetermined point and until the thick portion has moved from beneath the presser foot, means then acting to release the blade but stop the feed roller until the blade has reached a predetermined angular position with relation to the work such that the blade in its further rotation will engage the work just rearward of its thickened portion and then again release the feed roller.

17. A machine for cutting blanks from a strip of material having non-usable portions thicker than the usable portions of the strip including a rotatable blade, a controlling member disposed in advance of the blade and bearing against the strip and raised or lowered thereby, a feeding means disposed in advance of the rotatable blade, and means actuated automatically by the arrival of a thick portion of the strip beneath the controlling member delaying the action of the cutting means until the rear end of the thick portion has passed the controlling member, means then acting to delay the actuation of the feeding means until the cutting means has reached a predetermined position with reference to the rear end of the thickened portion, said position being such that the cutting means in its further movement will engage just behind the thickened portion, said means then acting to cause the feeding means and the cutting means to both operate to bring the cutting means in contact with the strip just behind the thickened portion.

18. A machine for cutting blanks from a strip of material having nonusable portions differing in dimension from the usable portions of the strip including a rotatable cutting blade, a controlling member in advance of the blade and bearing against the strip and shifted by variations in dimensions of the strip, feeding means disposed in advance of the rotatable blade, and means actuated by the arrival of a nonusable portion of the strip in coactive relation to the controlling member delaying the action of the cutting means until the rear end of the unusable portion has passed the controlling member, means then acting to delay the actuation of the feeding means until the cutting means has reached such a predetermined position with reference to the rear end of the unusable portion that in its further movement the cutting means will engage the strip just behind the unusable portion, said means then acting to cause the feeding means and the cutting means to both operate to bring the cutting means in contact with the strip just behind the usable portion.

19. A machine for cutting blanks from a strip of material having nonusable portions thicker than usable portions including a rotatable blade, a controlling member in advance of the blade and bearing against the strip, a feed roller disposed in advance of the blade, means for driving the feed roller and blade, means actuated automatically by the lifting of the controlling member by a thick portion of the strip, disconnecting the blade from its driving means and stopping the blade when it has reached a predetermined position, said means again operatively connecting the blade to the driving means when the thick portion has passed and permitted the controlling member to descend, means then acting automatically to disconnect the feed roller from the driving means to thereby hold back the strip until the blade has reached such an angular position with reference to the work that it will on its further rotation engage the work just back of the thickened portion, and means acting automatically when the blade has reached this position to again connect the feed roller with its driving means.

20. A machine for cutting blanks from a strip of material having nonusable portions disposed at irregular intervals and differing in character from the usable portions of the strip including cutting means, feeding means for the strip, a controlling member bearing against the strip and shiftable from a normal position by the nonusable portions of the strip, means for driving the feeding means and the cutting means, means actuated automatically by a shifting of the control member through its contact with a nonusable portion of the strip, disconnecting the cutting means from the driving means and stopping the cutting means when it has reached a predetermined position, said last named means again operatively connecting the cutting means to the driving means when the nonusable portion of the strip has passed the control means, means then acting automatically to disconnect the feeding means from the driving means to thereby hold back the strip until the cutting means has reached such a predetermined position with reference to the work that it will on its further movement engage the work just back of the nonusable portion, and means acting automatically when the cutting means has reached this position to again connect the feeding means with the driving means.

In testimony whereof I hereunto affix my signature.

JAMES H. DALE.

CERTIFICATE OF CORRECTION.

Patent No. 1,837,762.  Granted December 22, 1931, to

JAMES H. DALE.

It is hereby certified that the above numbered patent was erroneously issued to "D. L. Marx Co. Inc., of Cairo, Illinois, a corporation of Illinois, as assignee of the entire interest in said invention, whereas said patent should have been issued to the inventor, said Dale and D. L. Marx Co. Inc., of Cairo, Illinois, a corporation of Illinois, as assignee of one-half interest only in said invention, as shown by the records of assignments in this office; and that the said Letters Patent should be read with this correction therein that the same may conform to the record of the case in the Patent Office.

Signed and sealed this 23rd day of February, A. D. 1932.

(Seal)

M. J. Moore,
Acting Commissioner of Patents.